Figure 1:
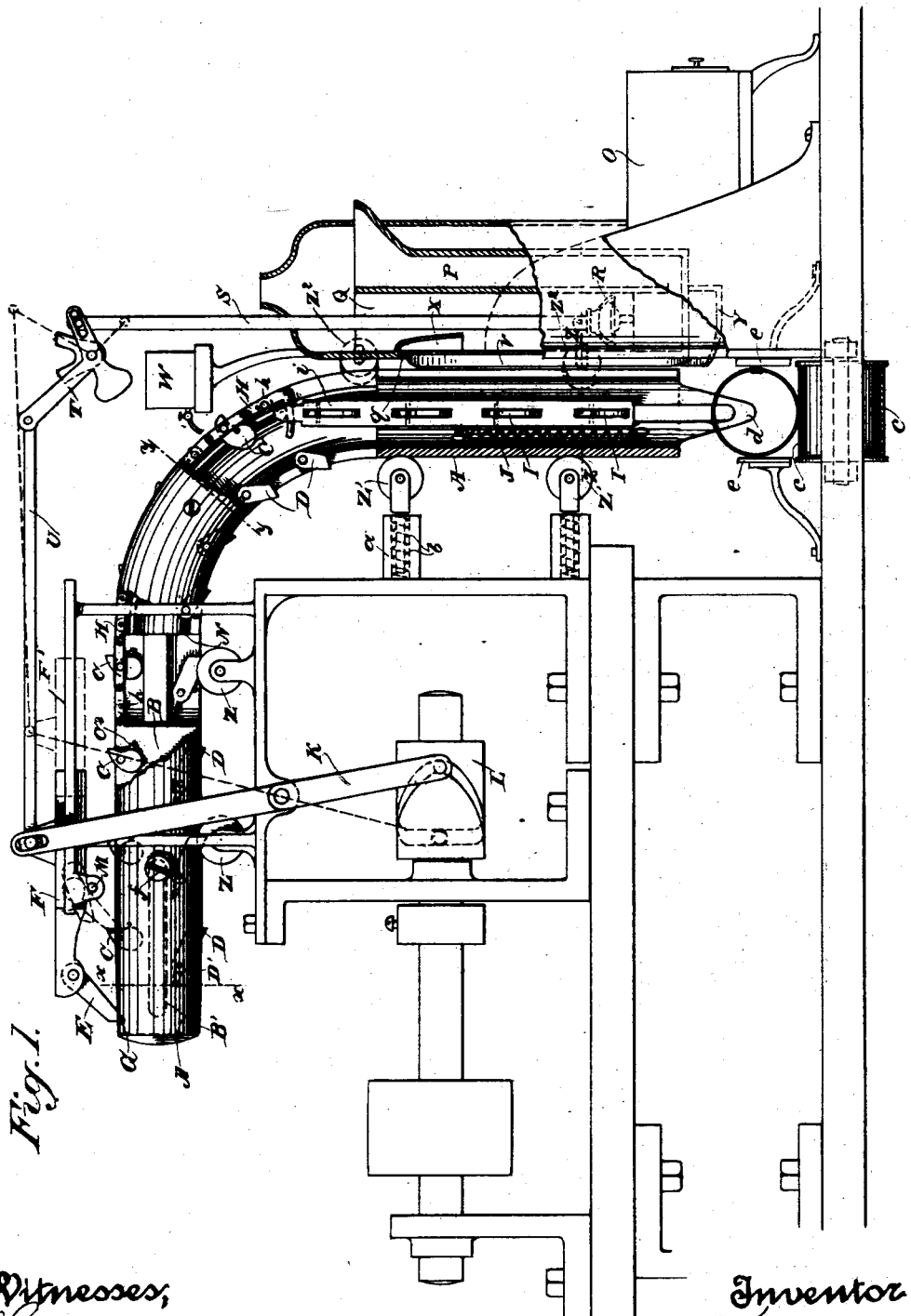

(No Model.)  2 Sheets—Sheet 1.

C. M. SYMONDS.
CAN SOLDERING MACHINE.

No. 525,521.  Patented Sept. 4, 1894.

Witnesses:

Inventor,
Clarence M. Symonds
By Dewey & Co.
Attys (No Model.) 2 Sheets—Sheet 2.
C. M. SYMONDS.
CAN SOLDERING MACHINE.
No. 525,521. Patented Sept. 4, 1894.
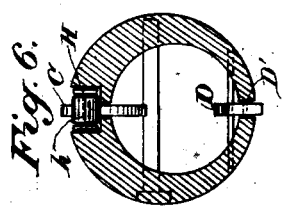
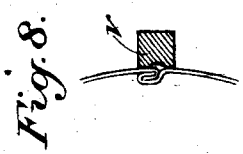
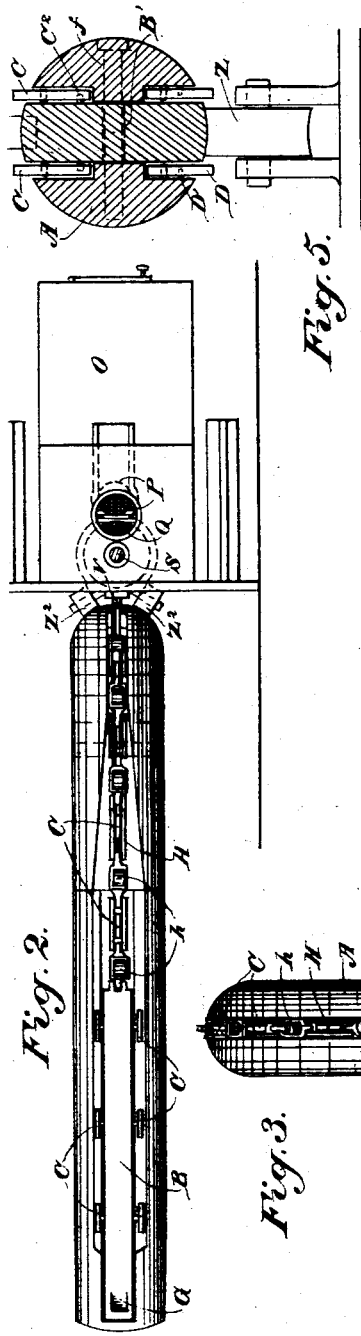
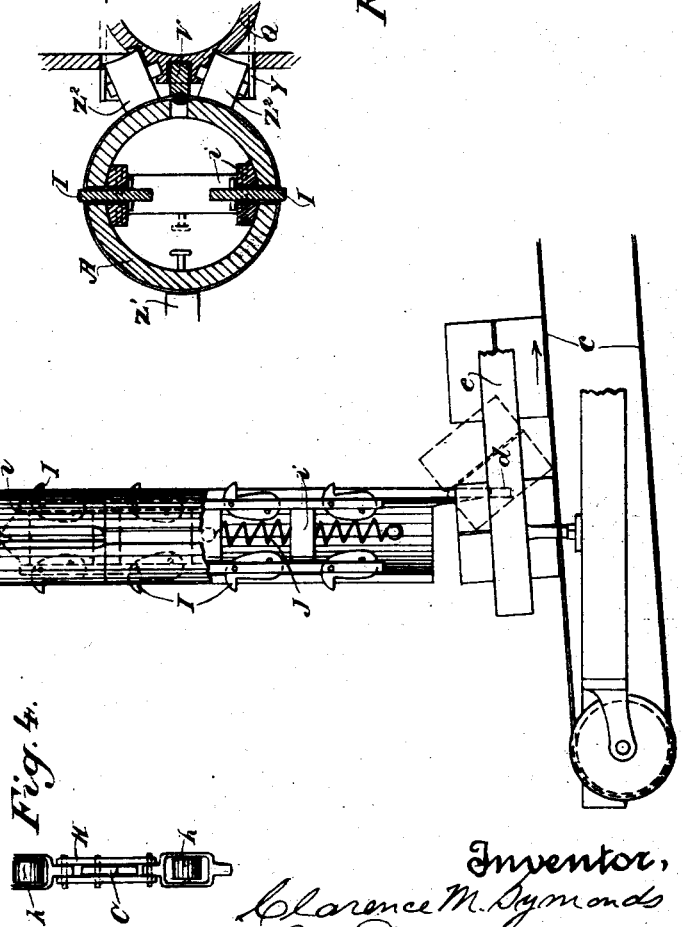
Witnesses
Inventor,
Clarence M. Symonds
By Dewey & Co.
THE NORRIS PETERS CO., PHOTO-LITHO., WASHINGTON, D. C.

500
UNITED STATES PATENT OFFICE.

CLARENCE M. SYMONDS, OF SAN FRANCISCO, CALIFORNIA.

CAN-SOLDERING MACHINE.

SPECIFICATION forming part of Letters Patent No. 525,521, dated September 4, 1894.

Application filed April 11, 1894. Serial No. 507,175. (No model.)

*To all whom it may concern:*

Be it known that I, CLARENCE M. SYMONDS, a citizen of the United States, residing in the city and county of San Francisco, State of California, have invented an Improvement in Can-Soldering Machines; and I hereby declare the following to be a full, clear, and exact description of the same.

My invention relates to a novel machine for soldering cans and other tubular bodies having a side seam.

It consists in certain details of construction, which will be more fully explained by reference to the accompanying drawings, in which—

Figure 1 is a side elevation and partial section of my apparatus. Fig. 2 is a top or plan view of the same showing some of the parts omitted. Fig. 3 is a rear end view of the mandrel partially broken away and means for receiving the cans from the mandrel. Fig. 4 is a detail of the chain. Fig. 5 is a vertical section on line $x$—$x$ of Fig. 1. Fig. 6 is a section on line $y$—$y$ of Fig. 1. Fig. 7 is a horizontal section on line $z$—$z$ of Fig. 1. Fig. 8 is a detail section of the soldering iron and seam.

The object of my invention is to provide an apparatus for the soldering of tubular metallic cans or similar bodies, by the application of molten solder so that it flows by gravitation along the seam, and I am enabled to dispense with solder baths and appurtenances necessary to the soldering of seams in a horizontal position.

A is a mandrel having the end made slightly tapering and adapted to receive can bodies or equivalent tubes which are delivered to it either directly from the machine which forms the can bodies, or previously completed can bodies may be fed to it by hand or machinery as desired. This mandrel is preferably made in two parts, hollow to receive the feed bar B, and slotted to receive the frame $i$ carrying the gravity pawls I. This feed bar has loosely pivoted to it the swinging gravity pawls C, the lower ends of which are sufficiently heavy to hold them normally down against stop pins $C^2$, with the upper ends projecting through a slot or channel in the mandrel so that they will tilt to allow a can body to slip over them, but will immediately assume their normal position with the upper ends projecting so as to engage the rear edge of the can body and advance it when the feed bar is reciprocated in the direction toward which the can is to advance.

In the lower part of the mandrel are fulcrumed the dogs or stops D which in like manner project through the bottom of the mandrel so as to tilt and allow the can bodies to slip over them, and they fall against the stop pins D' as soon as the can body has passed so as to prevent its being dragged backward when the feed bar is retracted.

In order to actuate the feed bar I have shown a pawl E fulcrumed to a horizontally sliding cross-head F, slidable in guides F' said pawl having its point adapted to fall into a notch G in the feed bar so that when the cross-head is reciprocated in one direction, the pawl will engage this notch and force the feed bar back.

The mandrel is curved from a horizontal to a vertical position as shown, and a chain H is connected with the forward end of the feed bar. The chain has anti-friction rollers $h$ which travel in a groove around the curve in the mandrel. It is connected with a frame $i$ carrying side pawls I after it reaches the vertical portion of the mandrel, and the frame is connected with a spring J which is elongated when the feed bar B is retracted, and which acts to draw the feed bar and chain forward when the feed bar is released from the power which retracted it.

The feed bar is slotted at B' and a fixed pin $f$ passes through the slot as a guide and to prevent the rear end of the bar from being lifted by the pull of the chains.

The cross-head F is connected by a connecting rod or bar K with a grooved cam L upon a driving shaft of the machine and this cam acts through the bar K to reciprocate the cross-head upon its guides F'.

As before stated, when the cross-head is reciprocated so as to retract the feed bar, the pawl E falls into the notch G of the feed bar and retracts it.

Any can which is upon the mandrel at the time will be prevented from moving back with the feed bar, by means of the pawls D which project through the bottom of the mandrel in the horizontal and also the curved portion.

When the feed bar is relieved from the pressure of the pawl E, the spring J acts through its connections to draw the bar and the chain forward, and the pawls C upon the feed bar, and also those upon the chain where it passes around the curve and upon the vertical frame, act to advance any cans which may be in front of them.

When the feed bar reaches the forward end of its stroke, it is arrested by shoulders in the mandrel as shown at N, but the reciprocating cross-head F is still moved a little farther back and the pawl E is thus drawn over a pin M fixed with relation to it, so that as the pawl is drawn over this pin, its point is lifted from the notch G in the feed bar, sufficiently to allow another can to be placed upon the mandrel and moved beneath the pawl, and in front of a dog D. As soon as the cross-head is again moved in the opposite direction, the pawl is disengaged from the pin and drops into the notch so as to again retract the feed bar.

The curved portion of the mandrel which unites the horizontal with the vertical portion is provided as before stated with stop pawls, while the chain has gravity pawls C which act to advance the cans around the curve until they are delivered upon the vertical portion of the mandrel A.

The seams of the can are placed uppermost upon the horizontal portion of the mandrel, and when they reach the point N against which the feed bar is arrested, the slot or channel is tapered into a narrower portion as it passes around the curve, which narrower slot serves to guide the seam to present it in the proper position for soldering.

The soldering is effected as follows:—O is a furnace having within it two chambers P and Q. The chamber P is adapted to receive the solder which is introduced through a suitable chute or opening at intervals while the chamber Q forms a cylinder in which reciprocates a loosely fitting plunger R, this plunger being adapted to raise the solder within the cylinder at each stroke. The plunger R has a rod S which connects it with a bell crank lever T suitably fulcrumed with relation to the plunger and the cross-head F. One arm of the bell crank lever is connected with the plunger rod and the other with the cross-head by means of a pitman or connecting rod U. On the side of the plunger chamber or cylinder which is adjacent to the vertical portion of the horn A is fixed the soldering iron V, projecting so that the seam of a can passing down the vertical portion of the mandrel will travel in contact with this iron and will be kept hot by it. The edge of the iron is concaved to properly fit the seam of the can and allow the solder to flow down the center of the bar.

Above the melting pot and soldering iron, is fixed the acid tank W having any suitable means for applying acid to the seam of each can as it passes it, and before it reaches the soldering iron.

In the upper part of the plunger chamber or cylinder is a passage X through which a portion of the solder is delivered by the raising of the plunger. This solder is delivered above the upper end of the soldering iron at $q$ and as a can body has, at this instant, been advanced so that it rests against the soldering iron, the solder thus delivered upon the upper end of the can seam above the upper end of the iron will flow by gravitation along the inside and outside of the entire length of the seam and will be thoroughly soaked through the seam as it flows down; the said solder also flowing through the seam if the latter is sufficiently open to permit such flow.

At the lower end any surplus solder is delivered into a receiver Y which is kept hot by the furnace and from which the surplus may from time to time be returned to the melting pot.

In order to retain the mandrel in its proper position relative to the soldering iron and compensate for expansion and contraction of parts, I have shown the horizontal portion of the mandrel supported upon broad grooved rollers Z which allows it a slight motion.

Against that portion of the vertical part of the mandrel which is opposite the melting pot are corresponding rollers $Z'$ journaled in forks having rearwardly extending shafts. These shafts travel in reciprocating guide chambers $a$ and are pressed forward by springs $b$ surrounding them within these chambers so that a light pressure is brought upon the vertical portion of the mandrel A at all times, and this insures the contact of the seam of the can with the soldering iron while the can is passing, and prevents the can slipping down the mandrel. The roller supports have shoulders or stops to limit their backward movement.

The mandrel is supported and guided upon the side adjacent to the melting pot, by grooved rollers $Z^2$ against which it is supported at this point. These rollers keep the mandrel at a proper distance from the soldering iron.

In order to allow the seam to form contact with the soldering iron, it will be noted that whereas the pawls which advance it are approximately in line with the seam while it is passing along the horizontal and curved portion of the mandrel, the chain is connected at the upper part of the vertical portion of the mandrel with a frame $i$ which carries the pawls I which are at the sides of this portion of the mandrel, thus allowing the seam an unimpeded contact with the soldering iron. I have found that by this method of soldering, the liquid solder flows down upon the outside and inside of the seam, and thoroughly soaks through it making a very perfect joint, while all surplus is discharged at the bottom and a very smooth joint is made without the necessity of wipers or other appurtenances.

When a can reaches the bottom of the mandrel, it is delivered upon a horizontal traveling belt c which moves at a slight inclination.

At the bottom of the mandrel A, upon one side, are projections d in such position with relation to the mandrel, can and belt, that when the end of the can touches the belt, these projections will act against its upper end, while the belt is moving the lower end, so that the can is tipped over upon its side with the seam lying midway between the top and bottom of the can upon one side as shown in Fig. 3. The can is retained in this position by guides e upon each side which prevent its rolling off the belt. The can being delivered upon the belt in this position, and the belt standing at a small inclination, the still hot liquid solder is in a condition to flow freely and any small portion which may adhere by capillary attraction at the bottom of the can at the instant of its delivery from the mandrel, will flow along the seam toward the opposite end by reason of the inclination of the belt, and will thus be evenly and smoothly distributed along the seam. The belt carries the cans along and delivers them at any desired point.

Having thus described my invention, what I claim as new, and desire to secure by Letters Patent, is—

1. The method herein described of soldering cans, consisting, essentially, in holding the can in an upright position and then applying molten solder to the upper end of the seam and permitting the solder to flow by gravitation through and along the inside and outside of the entire length of the seam.

2. The method herein described of soldering cans, consisting, essentially, in holding the can in an upright position and then applying molten solder to the upper end of the seam and permitting the solder to flow by gravitation along the inside and outside of the entire length of the seam.

3. The method herein described of soldering cans, consisting, essentially, in holding the can in an upright position and then applying molten solder to the upper end of the seam and permitting the solder to flow by gravitation through and along the inside and outside of the entire length of the seam and soak into the same.

4. The method herein described of soldering cans, consisting, essentially, in holding the can in an upright position and then applying molten solder to the upper end of the seam and permitting the solder to flow by gravitation along the inside and outside of the entire length of the seam and soak through the same.

5. The method herein described of soldering cans, consisting, essentially, in holding the can in an approximately upright position and then applying molten solder to the upper end of the seam and permitting the solder to flow by gravitation along the entire length of the seam.

6. The method herein described of soldering cans, consisting, essentially, in holding the can in an upright position and then applying molten solder to the upper end of the seam and permitting the solder to flow by gravitation along the entire length of the seam and soak through it.

7. A soldering device consisting of a vertical guide or mandrel for the cans and a vertical soldering iron against which the side of the can forms contact, and a means for delivering the solder upon the upper end of the seam whereby it flows along the seam by gravitation.

8. A soldering apparatus consisting of a device for applying the solder to the upper end of the side seam of the can while the latter is held in a vertical position, and a means for heating the seam so that the liquid solder will flow over and through it by gravitation.

9. A vertical mandrel, means for advancing cans upon said mandrel, a melting pot for solder, a vertical iron heated therefrom and adapted to form contact with the can, and a means for delivering molten solder from the pot upon the upper end of a can seam.

10. A vertical mandrel upon which the cans are received and guided, a melting pot having a reciprocating plunger movable therein whereby a portion of the solder is elevated, a passage through which the solder is delivered to the upper end of the can seam, a vertical soldering iron heated from the melting pot furnace and forming contact with the seam over which the molten solder flows by gravitation.

11. A melting pot having an exterior chamber into which the solder is fed, a plunger chamber with a plunger reciprocating therein, a passage through which molten solder is delivered intermittently, a vertical soldering iron projecting from the melting pot below the solder opening, and heated thereby and a mandrel or guide by which the can is supported with its side in contact with the soldering iron whereby the solder flows along the seam by gravitation.

12. A vertical guide for cans, a means for applying solder to the side seam thereof to flow down the seam by gravitation, an inclined traveling receiving belt below the guide or mandrel upon which the cans are delivered, and means for tilting the can to rest upon its side after leaving the mandrel whereby any surplus molten solder will flow along and equalize itself upon the seam.

13. In a can soldering machine the vertical melting pot and soldering iron, a mandrel and guide consisting of vertical and horizontal portions, and a curved connecting portion over which the cans pass from the horizontal to the vertical portion, a reciprocating feed bar movable in the horizontal portion of the mandrel having gravity pawls adapted to engage and advance the can bodies, corresponding stop pawls upon the mandrel whereby the cans are prevented from being retracted and a flexible connection with the feed bar extending around the curved portion of the mandrel and carrying pawls similar to those upon the feed bar.

14. The mandrel having a horizontal portion, a vertical portion and an intermediate curved portion, a feed bar adapted to reciprocate in the horizontal portion of the mandrel with gravity pawls for advancing the cans, a reciprocating cross-head movable upon guides parallel with the mandrel, a pawl projecting from said cross-head adapted to engage a notch in the feed bar to retract it when the cross-head is moved in one direction, and a pin or stop over which the pawl is dragged at the end of the reciprocation in the opposite direction so as to arrest it above the feed bar and mandrel and allow a can to be introduced upon the mandrel beneath.

15. A melting pot, soldering iron, and device for supplying solder thereto, a mandrel over which the cans are guided with the seams in contact with the iron, and guide rollers by which the mandrel is held in proper relation to the soldering iron.

In witness whereof I have hereunto set my hand.

CLARENCE M. SYMONDS.

Witnesses:
S. H. NOURSE,
H. F. ASCHECK.